United States Patent

[11] 3,557,829

| [72] | Inventor | Lloyd D. Finley<br>Lockport, Ill. |
|---|---|---|
| [21] | Appl. No. | 857,166 |
| [22] | Filed | Sept. 11, 1969 |
| [45] | Patented | Jan. 26, 1971 |
| [73] | Assignee | Caterpillar Tractor Co.<br>Peoria, Ill.<br>a corporation of California |

[54] PILOT VALVE FOR ACTUATING A MAIN CONTROL OF THE HYDRAULIC CIRCUIT
3 Claims, 1 Drawing Fig.

[52] U.S. Cl. .................................................. 137/596.2,
91/461
[51] Int. Cl. ................................................ F15b 13/042
[50] Field of Search .............................................. 137/596.13,
596.14, 625.6, 625.61, 625.62, 625.63, 596.15,
596.18, 625.66, 502, (Inquired); 91/(Inquired),
461X; 137/502

[56] References Cited
UNITED STATES PATENTS

| 2,366,127 | 12/1944 | Rappl ........................... | 137/596.2X |
| 2,671,443 | 3/1954 | Meddock ..................... | 137/596.2X |
| 2,947,322 | 8/1960 | Christensen.................. | 137/596.2X |
| 2,974,647 | 3/1961 | Carey........................... | 137/596.18X |
| 3,456,688 | 7/1969 | Clark............................ | 137/625.66X |

*Primary Examiner*—M. Cary Nelson
*Assistant Examiner*—Robert J. Miller
*Attorney*—Fryer, Tjensvold, Felix, Phillips & Lempio ABSTRACT: A pilot valve for use in a bridge type circuit which is employed to actuate a control valve in a main control circuit and in which control of pressures in the bridge circuit is the function of simple poppet valves. The valves are closed by spring pressure augmented by fluid pressure in the pilot system. Varying the pressure behind the two valves permits one of them to open to reduce pressure on one side of the main valve and increase pressure on the other side.

PATENTED JAN 26 1971
3,557,829
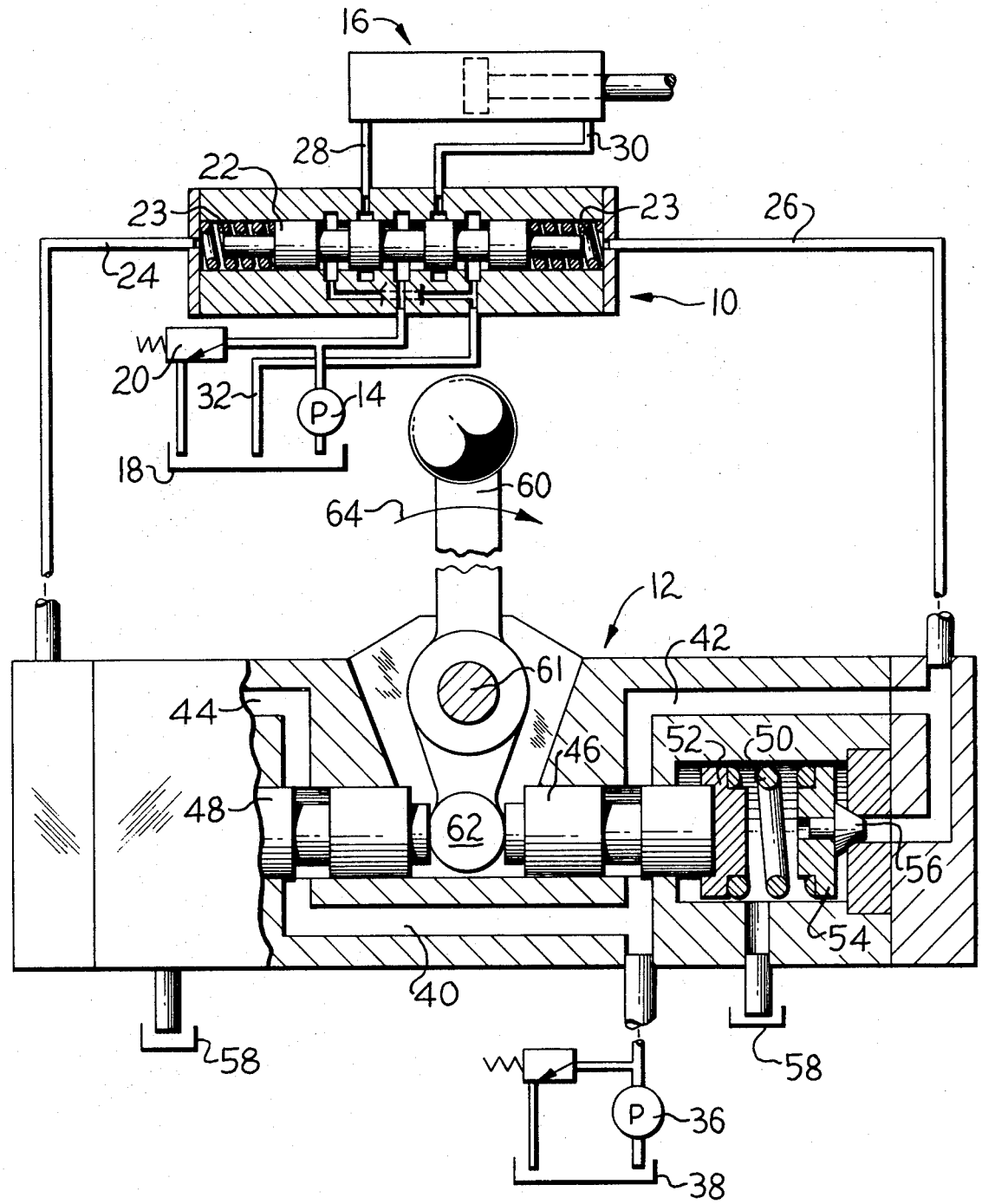
INVENTORS
LLOYD D. FINLEY
BY
Fryer, Zinnwald, Feix, Phillips + Lempio
ATTORNEYS

PILOT VALVE FOR ACTUATING A MAIN CONTROL OF THE HYDRAULIC CIRCUIT

Conventional pilot valves employ spools which permit controlled leakage of pressure from one or the other side of a bridge circuit. The machining of such valves requires very close tolerances to prevent leakage. Since in pilot systems the fluid pressure is often very low to begin with, any leakage could cause faulty operation. Also, the valve timing, which is controlled by the spacing of the lands on the spools is quite critical so that the entire valve presents costly manufacturing procedures.

The present invention employs poppet valves instead of spool type valves with poppets closed by spring force augmented by the pressure of fluid in the pilot system. A manual control is provided to increase the spring force on one poppet and reduce it upon the other so that the valve with reduced pressure opens to relieve pressure on one side of the bridge circuit, while pressure on the other side remains high and serves to actuate the main control valve. Since very little pilot pressure is lost as compared to the spool valve type where a restricted orifice bypasses fluid in the pilot system, the system of the present invention has obvious advantages.

The invention will best be understood by reference to the following specification and accompanying drawing.

The drawing is a schematic view of a control system including a pilot valve embodying the present invention.

In the system shown in the drawing a main control valve generally indicated at 10 is actuated by a pilot valve generally indicated at 12. The main control valve is illustrated as controlling fluid under pressure, as from a pump 14, selectively to opposite ends of a fluid motor illustrated as a hydraulic jack 16, of conventional type. Pump 14 withdraws fluid from a reservoir 18 and with the valve 10 closed, as shown, the pressurized fluid is returned to the tank through a check valve 20. The valve 10 is snown in its neutral position and as having a spool 22 normally held in this position as by springs shown at 23. Lines 24 and 26, which form a part of a pilot control bridge circuit, communicate with opposite ends of the valve 10 so that when the pressure in either one exceeds that in the other it tends to move the spool 22 either toward the left to communicate fluid to the head end of the jack 16 through a line 28 and communicate fluid from the rod end of the jack, through a line 30 and line 32, to the reservoir. As is apparent, movement of the spool 22 toward the right has the opposite effect, energizing the jack from its rod end and returning fluid from the head end to the reservoir.

The pilot valve 12 receives pressure from a pilot pump 36 which withdraws fluid from a reservoir 38. This fluid is directed to a passage 40, common to both sides of the pilot valve, and thence through passages 42 and 44 and to the lines 26 and 24 respectively. Flow to these lines is controlled in part by spools 46 and 48 normally open to permit full pressure through passages 42 and 44. Springs 50, only one of which is shown, tend to maintain the spools 46 and 48 in their normal open positions shown. Each spring is disposed between a seat 52 bearing against the end of the spool and a seat 54 carrying a poppet valve element 56 normally closed by spring pressure and adapted, when open, to discharge pressure from the line 26 or the line 24 to a low pressure sump 58. This sump could be the reservoir 38. The pilot valve is actuated by a lever 60 pivotally supported as at 61 and having a round end 62 disposed between the spools 46 and 48. If this lever is moved toward the right as indicated by the arrow 64, the spring 50 on the right will move the spool 46 out of registry with the passage 42. With reduced force behind spring 50, pressure in line 26 can escape through poppet valve 56 and return to the sump 58. Spool 48 will have been moved slightly toward the left where it still communicates passage 40 with passage 44 so that all of the pump pressure is directed through line 24 to the left end of valve 10 shifting it toward the right. Movement of lever 60 toward the left produces the same effect upon valve 10 but in the opposite direction. Modulation results when the lever 60 is moved only a short distance and pressure on the spring 50 is only slightly reduced. This permits limited opening of the poppet valve and back pressure in the main valve.

With the construction described, fluid in the pilot circuit is not regulated by a restricted orifice created by the shifting of a spool in a valve and no flow of such pilot fluid is required to maintain the main valve 10 in its balanced or neutral position. Since flow in the pilot system is not necessary, a relatively low pressure can be used in the system and the pilot pressure will be adequate for operating several different main control valves.

Poppet valves are less costly and less likely to leak than spool type valves and since they provide the control in the present device, the spools need not be made to the close tolerances required when they are the main controlling elements.

I claim:

1. A pilot valve for directing fluid pressure from a source selectively to actuate a main valve in either one of two directions comprising normally open passages communicating the source pressure with two positions at the main valve, two spring closed poppet valves normally preventing release of said pressure, and manually actuated means to increase the force on the spring of one poppet and reduce pressure on the spring of the other whereby pressure is released at one position at the main valve while maintained at the other position.

2. The pilot valve of claim 1 in which the poppet valves are disposed adjacent opposite ends in a common housing, the housing having spring chambers and springs behind the poppets and having a bore communicating between said chambers, valve spools in said bore controlling flow through said normally open passages, a manually actuated lever engageable between said spools to move one to compress one poppet spring and permit the other spring to urge the other spool to close its passage.

3. The pilot valve of claim 2 in which the poppets normally close communication between said normally open passages and atmosphere.